United States Patent [19]

Johansson et al.

[11] 4,051,742
[45] Oct. 4, 1977

[54] ARRANGEMENT FOR TENSIONING AND GUIDING THE BELTS OF A CELLULAR PLASTIC FORMING MACHINE

[75] Inventors: Jan-Olof Johansson, Hoganas; Karel Spacek, Morarp, both of Sweden

[73] Assignee: Gullfiber AB, Billesholm, Sweden

[21] Appl. No.: 720,412

[22] Filed: Sept. 3, 1976

[30] Foreign Application Priority Data

Sept. 5, 1975 Sweden .................................. 7509903

[51] Int. Cl.² .......................... F16H 7/18; F16H 7/12; F16H 7/10
[52] U.S. Cl. ............................... 74/241; 74/242.1 FP; 74/242.11 R; 74/242.13 A
[58] Field of Search ....... 74/241, 242.1 FP, 242.11 R, 74/242.13 A

[56] References Cited

U.S. PATENT DOCUMENTS

| | | | |
|---|---|---|---|
| 2,526,033 | 10/1950 | Lyon | 74/241 X |
| 3,159,268 | 12/1964 | Dyke | 74/241 X |
| 3,545,599 | 12/1970 | Smith et al. | 74/241 X |
| 3,702,131 | 11/1972 | Stokes et al. | 74/241 X |
| 3,789,552 | 2/1974 | Bradbury et al. | 74/241 X |
| 3,861,230 | 1/1975 | Brovoll | 74/241 |

*Primary Examiner*—Leonard H. Gerin
*Attorney, Agent, or Firm*—Birch, Stewart, Kolasch & Birch

[57] ABSTRACT

An automatic-tensioning arrangement for roller driven belts of a cellular plastic forming machine is described. Sensor means are provided for detecting lateral movement of the belts on the support or drive rollers thereof and for generating a control signal in response thereto. The control signal from the sensor means is applied to a hydraulic tensioning device which displaces the drive rollers longitudinally of the belts to automatically tension the belts in response to detected lateral belt movement. A hydraulic tensioning device is provided for each end of each drive roller so the respective ends can be moved separately from one another. Accordingly, by selective movement of the respective ends of the rollers the belts can be guided back to normal desired position in response to a control signal from the respective sensor means.

4 Claims, 4 Drawing Figures

ARRANGEMENT FOR TENSIONING AND GUIDING THE BELTS OF A CELLULAR PLASTIC FORMING MACHINE

The present invention relates to an arrangement for tensioning and guiding the belts of a cellular plastic forming machine, which forms cellular plastic in a line between parallel endless moving belts, each of which passes over at least two rollers which constitute a pair of end rollers, in which arrangement a hydraulic device, including a piston sliding in a cylinder, is connected between each end of at least one roller in every pair of end rollers, each such end being mounted in a guiding device so as to be displaceable in a direction parallel to the forming line, and a corresponding stationary support, and is supplied via an adjustable control valve device fitted in the pressure line and by the operation of a pump with hydraulic fluid to regulate the position of the piston in the cylinder and hence the position of the corresponding roller end in relation to the stationary support.

The belts used in the cellular plastic forming machine of the type referred to have a length which may be of the order of, for example, 40 meter. The considerable length of the belts makes it difficult to obtain a perfectly balanced belt. Irregularities therefore easily appear in the belt, which can cause the belt to become displaced laterally or to "drift" sideways on the rollers during use. Difficulties also arise with the adjustment of the mutual positions of the heavy end rollers and with the adjustment of the positions of the end rollers with respect to the belt. This latter circumstance can also cause the sideways drift mentioned above.

The above-mentioned lateral displacement of the belts can cause serious damage, and if the worst comes to the worst it can put the machine out of service completely. Damage in its turn involves expenses for replacement of broken parts, in addition to the cost of the stoppage.

The purpose of the invention is to obtain an arrangement for the automatic tensioning and guiding of the belts of a cellular plastic forming machine of the type mentioned in the introductory paragraph, the arrangement being such that the belts are always guided to their correct positions on the end rollers and the risk of damage thus completely eliminated. The invention makes this possible by fitting a sensing device next to the belt in association with each cylinder in such a way that, when actuated by the belt as the latter drifts sideways, the sensing device actuates a corresponding control valve so that the pressure in the respective cylinder rises and the corresponding roller end increases the tension on the belt in the direction of the forming line, thus guiding the belt back to its intended normal position on the roller.

The invention is described in more detail below in the form of an embodiment thereof, with reference made to the appended drawings.

Figure 3:
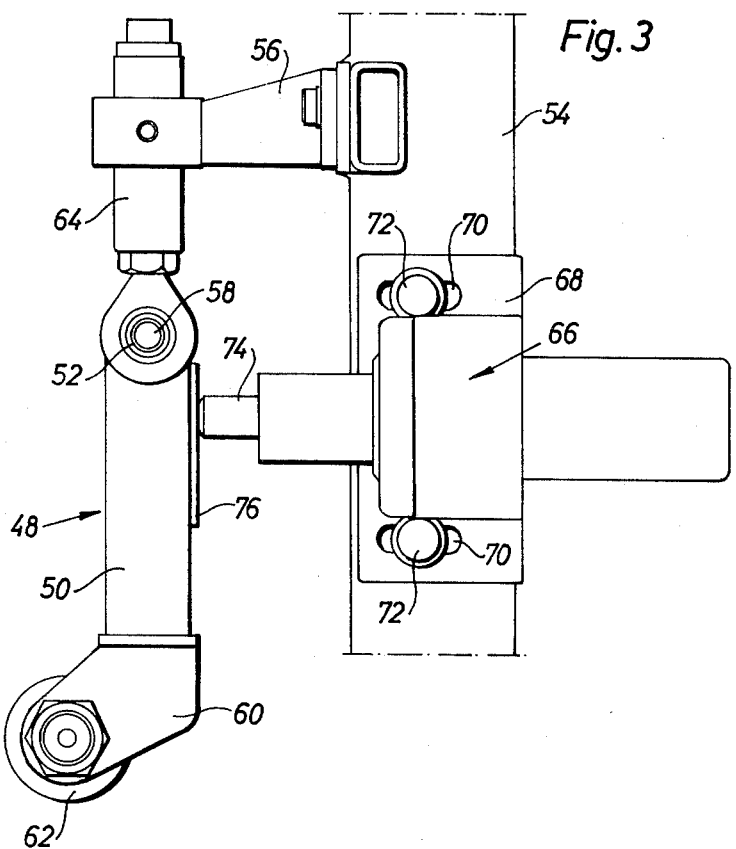

FIG. 3 thows a view from above and partly in section of the sensing device used according to the invention, and the associated control valve and mounting components.

Figure 4:
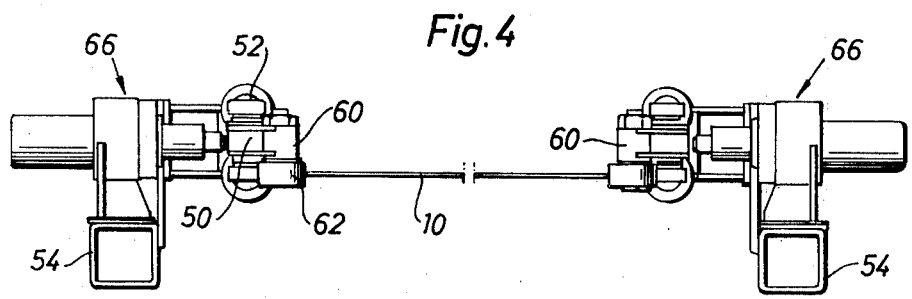

FIG. 4 shows, as seen from one end of the cellular plastic forming machine, the sensing devices, fitted on either side of a belt, and the control valves, in accordance with the invention, as well as adjoining components.

Corresponding parts are given the same numbers in the different drawings.

Figure 1:
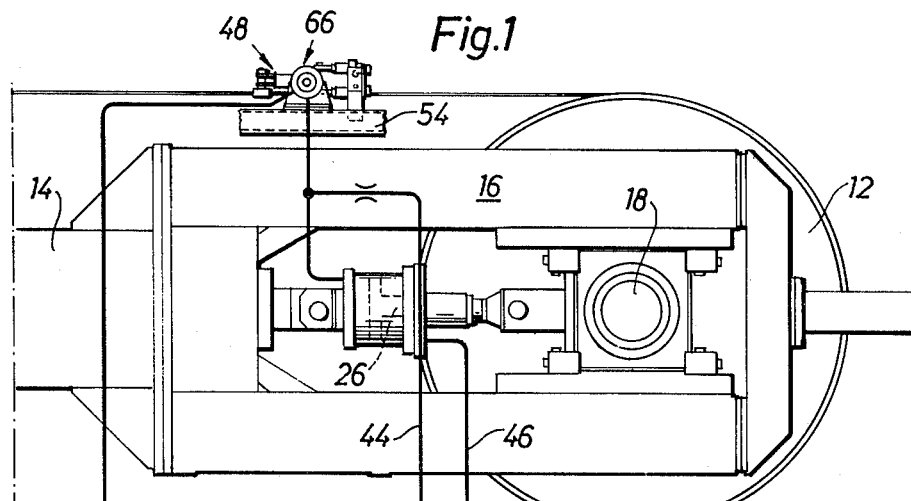
FIG. 1 shows a vertical view, partly in section, of one end of a cellular plastic forming machine and those parts of it which are relevant to the arrangement for tensioning and guiding the belts in accordance with the invention.
Figure 2:
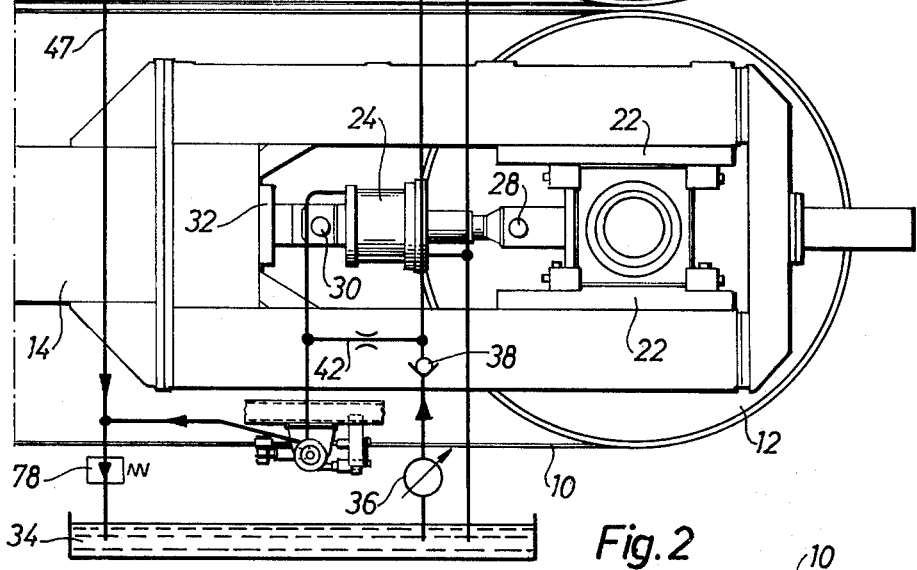
FIG. 2 shows a view from above and partly in section of one side of the arrangement as per FIG. 1.
Figure 2:
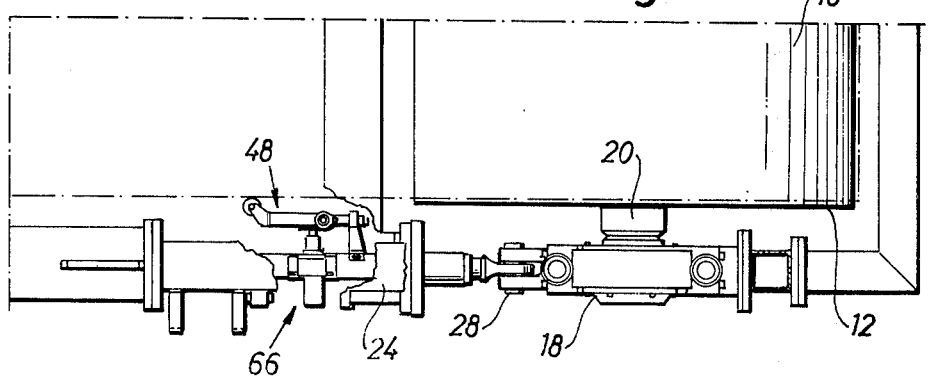

FIG. 1 shows one end of a cellular plastic forming machine, in which cellular plastic is formed in a line between two parallel longitudinal belts 10 passing over end rollers 12. Only one end roller 12 is shown for each belt 10 in the figure. In addition to the above-mentioned end rollers 12, additional supporting rollers (not shown) may be located between the two end rollers 12 for each belt 10.

Located on the frame 14 of the cellular plastic forming machine are supporting arrangements 16, containing a bearing box 18 in a sliding mounting at each end of a roller 12. Each end of the center shaft 20 of the roller 12 is mounted in its respective bearing box 18, which is able to travel along the supporting arrangements 16 in a direction parallel to the forming line. The supporting arrangement 16 consists of U-irons which are secured to the frame 14 and which support the slide bars 22 fitted on the upper and lower parts of the bearing box 18.

Each bearing box 18 is connected to a stationary part 32 of the frame 14 of the cellular plastic forming machine via a hydraulic device comprising a hydraulic cylinder 42 and a piston 26 sliding in the latter and via sliding couplings 28, 30. The couplings 28, 30 may be jointed both horizontally and vertically. This arrangement absorbs any torque in any direction which may occur at the joints without the hydraulic device 24 being subjected to harmful stresses.

From a reservoir in the form of a sump 34, hydraulic fluid is fed via a pump unit 36 and a non-return valve 38 through a hydraulic conduit 42, 44, to the pressure side of each cylinder 24. The pressure in the cylinder chambers can be preset within certain limits. A return line 46 leads back from the cylinders 24 to the sump 34.

According to the invention, the sensing device 48 fitted next to each belt 10 consists of a control arm 50, which is articulately attached (at 52) to a stationary part 54 of the frame 14 of the cellular plastic machine. An attachment unit 56 and a pin bolt 58 are among the means used for this purpose, the control arm 50 being mounted to swivel around the pin bolt 58. The external end 60 of the control arm 50 is bent towards the belt 10 and fitted with a guide pulley 62 which is mounted to rotate at the external end of the control arm 50. The position of the control arm 50 can be adjusted within certain limits by means of a screw arrangement 64. As shown in FIG. 1, the control arm 50 for the upper belt 10 is arranged so as to be actuated by the top part of the belt, while the control arm 50 for the lower belt 10 is arranged so as to be actuated by the lower part of the belt. This considerably simplifies the mounting and adjusting of the control arrangement. A control valve 66, also located on the stationary part 54, is fitted with a mounting 68, through which extend rectangular holes 70 for mounting screws 72 which permit adjustment of the position of the control valve 66 relative to the control arm 50. The flow of hydraulic fluid through the control valve 66, which is of the circulation valve type, is controlled by the effect of the pilot 74 of the valve. The outer end of the pilot 74 is in contact with a stop 76 on the control arm 50. When a belt 10 passing over the corresponding end roller 12 begins to drift towards one end of the roller 12, the belt 10 will strike the guide pulley 62 of the control arm 50, which causes the stop 76 of the control arm 50 to press against the pilot 74 of the valve 66. The pilot 74 is pressed into the valve 66, thus reducing the aperture in the latter for the flow of hydraulic fluid.

Because the control valve 66, as shown in FIG. 1, is connected to the pressure side of the hydraulic cylinder 24, and is also connected to the sump 34 via a circulation line 47, a reduction of the circulation aperture of the valve 66 causes the pressure to increase on the pressure side. This in turn causes the corresponding hydraulic piston 26 to be displaced to the right (FIG. 1), so that the corresponding roller end is carried against the belt 10 in a direction parallel to the forming line. This stretches the belt 10 at the end in question, and the belt 10 will drift back to its desired normal position on the roller 12.

It may be mentioned by the way that in a practical embodiment the pressure in the line 42, 44 on the pump side can be as much as 50-55 bar, and under these conditions the pressure prevailing in the line 47, equivalent to the tension on the belt, will be 20-30 bar. The latter pressure is adjusted by means of a by-pass valve 78.

By the set-up of hydraulic lines explained above, an automatic tensioning and guiding of the belts can be obtained. It is also possible to obtain a decrease in the pressure in the hydraulic cylinder 24 at one end of a roller 12 corresponding to an increase in pressure, caused by a reduced circulation aperture in a control valve 66, in the cylinder 24 at the other end of the roller 12. With an arrangement of this kind, the roller 12 will in practice describe a rotatory movement about an axis passing through the center of the roller at right angles to the direction of the forming line.

Modifications of the above described arrangement for tensioning and guiding belts can be realized within the terms of the invention. Thus, both the sensing device, comprising the control arm, and the control valve explained above may be of other designs which are known per se.

We claim:

1. In a machine for forming cellular plastic between parallel moving endless belts, an automatic tensioning and guiding system for said belts comprising:
   a pair of end rollers within each of said endless belts;
   hydraulic cylinder means having a piston coupled to each end of at least one end roller of each of said pairs;
   guide means for said at least one end rollers for movably supporting said rollers for displacement longitudinally of said endless belts in response to displacement of said piston coupled thereto;
   a source of hydraulic fluid under pressure;
   supply line means connecting said source of hydraulic fluid to said hydraulic cylinder means;
   adjustable control valve means for varying the pressure of fluid in said supply line and thus the position of the piston in said hydraulic cylinder means;
   senser means for detecting lateral displacement of said endless belt means and for adjusting said control valve means in response to said displacement to increase the pressure of fluid in said supply line;
   whereby said at least one end roller of each of said pairs is displaced in said guide means to increase the tension of the endless belt disposed thereon and guide the endless belt back to its normal position.

2. The invention according to claim 1 wherein a separate senser means is provided for each of said pistons coupled to respective ends of said at least one end rollers, whereby the respective ends of said rollers may be separately displaced.

3. The invention of claim 2 wherein said control valve means is disposed in a circulation line coupled to said supply line, said control valve including means for restricting fluid flow in said circulation line in response to a signal from said senser means to increase the fluid pressure in said supply line means and said hydraulic cylinder means.

4. The invention of claim 3 wherein said hydraulic cylinder means includes a plurality of hydraulic cylinders connected to a common fluid sump, a plurality of interconnected supply lines leading from said sump to said cylinders, a plurality of interconnected return lines leading from said cylinders to said sump, and a plurality of interconnected circulation lines leading from said sump to said supply lines, whereby an increase pressure on a piston in at least one end of a given roller will cause a corresponding decrease in pressure on a piston coupled to the opposite end of said given roller.

* * * * *